US012799792B2

(12) United States Patent
van Mourik

(10) Patent No.: US 12,799,792 B2
(45) Date of Patent: Nov. 17, 2026

(54) PINCH DETECTION SYSTEM

(71) Applicant: INALFA ROOF SYSTEMS GROUP B.V., Oostrum (NL)

(72) Inventor: Marco van Mourik, Ravenstein (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 315 days.

(21) Appl. No.: 18/519,842

(22) Filed: Nov. 27, 2023

(65) Prior Publication Data

US 2024/0174061 A1 May 30, 2024

(30) Foreign Application Priority Data

Nov. 30, 2022 (EP) .................................... 22210669

(51) Int. Cl.

*E05F 15/41* (2015.01)
*B60J 7/047* (2006.01)
*B60J 7/057* (2006.01)

(52) U.S. Cl.

CPC ............... *E05F 15/41* (2015.01); *B60J 7/047* (2013.01); *B60J 7/0573* (2013.01); *E05Y 2400/58* (2013.01)

(58) Field of Classification Search

CPC ......... B60J 5/04; B60J 7/02; B60J 7/04; B60J 7/047; B60J 7/05; E05F 15/41; E05F 15/42

USPC .................................. 296/152, 155, 216.01

See application file for complete search history.

(56) References Cited

U.S. PATENT DOCUMENTS

| | | | | |
|---|---|---|---|---|
| 6,036,259 | A * | 3/2000 | Hertel | H02G 11/00 174/117 F |
| 6,064,165 | A | 5/2000 | Boisvert et al. | |
| 6,794,837 | B1 | 9/2004 | Whinnery et al. | |
| 8,704,476 | B2 | 4/2014 | Egger et al. | |
| 11,482,960 | B2 * | 10/2022 | Craane | E05F 15/40 |

(Continued)

FOREIGN PATENT DOCUMENTS

| | | | |
|---|---|---|---|
| DE | 102009019015 | A1 | 11/2010 |
| EP | 4043681 | A1 | 8/2022 |

OTHER PUBLICATIONS

Search Report in European patent application No. 22210669.2 dated May 23, 2023.

*Primary Examiner* — Jason S Daniels

(74) *Attorney, Agent, or Firm* — Steven M. Koehler; Westman, Champlin & Koehler, P.A.

(57) ABSTRACT

An open-roof assembly for a vehicle roof comprises a moveably arranged closure member having a drive assembly and a control unit with a pinch detection unit. The pinch detection unit comprises a first pinch detection system, a second pinch detection system and a predetermined reference. Each of the first and second pinch detection systems comprises a tracker module configured to compare the movement of the closure member and the reference, the tracker module allowing a tolerance between movement and reference; a deviation module configured to determine a deviation, if the tolerance is exceeded; and pinch determination module configured to determine that a pinch occurs, if the deviation in movement exceeds a threshold. The tolerance of the first pinch detection system is smaller than the tolerance of the second pinch detection system. The threshold of the first pinch detection system is higher that the threshold of the second pinch detection system.

20 Claims, 5 Drawing Sheets

(56) References Cited

U.S. PATENT DOCUMENTS

| | | | | |
|---|---|---|---|---|
| 11,679,655 | B2 * | 6/2023 | Shingu | B60J 5/0477 296/155 |
| 2004/0183493 | A1 | 9/2004 | Boisvert et al. | |
| 2006/0238002 | A1 * | 10/2006 | Heyn | H02H 7/0851 296/214 |
| 2012/0112677 | A1 | 5/2012 | Egger et al. | |
| 2022/0268073 | A1 | 8/2022 | Craane et al. | |

* cited by examiner

PINCH DETECTION SYSTEM

BACKGROUND

The discussion below is merely provided for general background information and is not intended to be used as an aid in determining the scope of the claimed subject matter.

The invention relates to a pinch detection system for detecting a pinch of a moveably arranged closure member of an open-roof assembly with an object. Further, the invention relates to a corresponding method of detecting a pinch.

An open-roof assembly is well-known. The open-roof assembly is configured to be mounted in a vehicle roof and comprises at least one moveably arranged closure member. The closure member is configured and arranged to cover an opening in the vehicle roof or at least partly uncover the opening in the vehicle roof. Usually, but not necessarily, the closure member is a transparent panel and comprises glass or a suitable plastics. The closure member may be configured to tilt or to slide.

During a movement, i.e. a tilting movement or a sliding movement, a foreign object may become trapped between an edge of the opening in the vehicle roof and the moving closure member. In order to prevent damage to the closure member and the trapped object, it is known to provide a pinch detection system. Such a pinch detection system is intended to detect a pinch with a foreign object as soon as possible and to reverse a movement to ensure safe release of the foreign object. A pinch needs to be detected as soon as possible such that a force exerted on the foreign object is kept as small as possible. Legal requirements applicable in certain jurisdictions limit the maximum force under specified conditions.

Several different pinch detection systems are known. One of the known kinds of pinch detection systems is an indirect system, wherein a property of the open-roof system is detected, when the closure member is moving. The detected property is immediately analysed and an unexpected value of the property may be used to determine that a pinch has occurred. In a particular pinch detection system, the detected property relates to the movement of the closure member and a reference has been predetermined. For example, the reference comprises a speed or a current supplied to a motor of the drive assembly, possibly as a function of a position of the closure member. The detected property is compared to the reference and if a deviation of the detected property from the reference exceeds a predetermined threshold, it is determined that a pinch has occurred.

A pinch detection system needs to be able to detect a pinch with any foreign object irrespective of properties of the foreign object. Indirect pinch detection systems need to be designed with different kind of properties of foreign objects in mind. In particular, a stiffness or compression rate of the object needs to be considered. The stiffer the object, i.e. the higher the compression rate of the object, the faster an exerted force increases with displacement of the closure member. The stiffness is represented with a spring rate expressed in N/mm. With a soft object having a relatively low stiffness, e.g. a spring rate of about 10 or about 20 N/mm, the closure member may move over a small distance before a maximum pinch force of e.g. 100N is reached, giving the pinch detection system a short period of time to accurately detect whether a pinch actually has occurred. Thus, it is possible to prevent too frequent false pinch detections. However, with a hard object having a relatively high stiffness, e.g. about 65 N/mm, there is less time available and reliable detection becomes more challenging.

It is known that known pinch detection systems are usually suitable for reliable detection of soft objects or timely detection of hard objects. Combinations of two of such systems are therefore also suggested in prior art such that both soft and hard objects may each be detected in a timely manner. The pinch detection systems suitable for hard object detection are however still susceptive to false pinch detection and thus unnecessary reversals of the closure member, which may evidently annoy vehicle occupants and other users.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A pinch detection system reliably detects a pinch with soft and hard objects in a timely manner.

In a first aspect, an open-roof assembly for covering or at least partly uncovering an opening in a vehicle roof comprises a moveably arranged closure member, a drive assembly for moving the closure member and a control unit operatively coupled to the drive assembly for controlling a movement of the closure member. The control unit comprises a pinch detection unit for detecting a pinch of the closure member with an object. The pinch detection unit comprises a first pinch detection system, a second pinch detection system and a predetermined reference, which predetermined reference represents an undisturbed movement of the closure member. The first pinch detection system comprises a first tracker module configured to compare the movement of the closure member and the reference, the first tracker module allowing a first tolerance between movement and reference; a first deviation module configured to determine a first deviation in movement by the closure member, if the first tolerance is exceeded; and a first pinch determination module configured to determine that a pinch occurs, if the first deviation in movement exceeds a first threshold. The second pinch detection system comprises a second tracker module configured to compare the movement of the closure member and the reference, the second tracker module allowing a second tolerance between movement and reference, the second tolerance being larger than the first tolerance; a second deviation module configured to determine a second deviation in movement by the closure member, if the second tolerance is exceeded; a second pinch determination module configured to determine that a pinch occurs, if the second deviation in movement exceeds a second threshold, the second threshold being smaller than the first threshold. The pinch detection unit is configured to determine that a pinch occurs if at least one of the first and the second pinch detection systems determines that a pinch occurs.

Essentially, the pinch detection unit comprises two separate pinch detection systems cooperating to reliably detect a pinch with any foreign object. The first pinch detection system is initially configured to reliably detect a pinch with a soft object, wherein a slow change in operation over time may be detected in time to stop or reverse the closure member. In particular, the relatively small tolerance on the reference ensures that a deviation due to a soft object is quickly detected as a deviation. Due to the relatively large threshold, a short period of time is used to determine that a pinch has occurred. Such short period of time is available as above described in case of a pinch with a soft object. Moreover, such period of time allows to timely detect and thus prevent any false pinch detection.

The second pinch detection system is configured to detect a pinch with a hard object, wherein a sudden change in operation may quickly be detected and acted upon. The sudden change may be detected so fast, that sudden changes due to e.g. road conditions may be detected as a pinch as well. The second pinch detection system however employs a very short period of time to reliably determine whether a pinch with a hard object actually occurred. Thereto, the movement of the closure member is compared with the reference using a relatively high tolerance. Consequently, minor deviations from the reference are accepted without determining that a deviation actually occurred. Deviations exceeding the tolerance limit are detected as a deviation and if such deviation exceeds the second threshold, it is determined that a pinch occurred. Since the second threshold is relatively small, such deviation will rapidly exceed the second threshold, if a pinch with a hard object indeed occurred.

In an embodiment of the open-roof assembly, the second tolerance has been selected so high that pinch of the closure member with a soft object having a stiffness smaller than a predetermined stiffness is not detected by the second pinch detection system. For example, the predetermined stiffness of such soft object is equal to or larger than 10 N/mm and in particular is equal to or larger than 15 N/mm. Allowing the second pinch detection system to ignore any pinch with a soft object allows the second pinch detection system to be configured and dedicated to timely and reliably detect a pinch with a hard object. A pinch with a soft object will be timely and reliably detected by the first pinch detection system.

In an embodiment of the open-roof assembly, the reference represents a force exerted by the closure member as a function of a position of the closure member during undisturbed movement and the movement of the closure member corresponds to an actual force at an actual position of the closure member. Such a force may be derived from one or more detected properties and parameters of the closure member movement and of the drive assembly. For example, a current supplied to a motor of the drive assembly, a rotation speed of such a motor, e.g. determined using Hall sensors as known in the art, and other properties may be used. Further, predetermined parameters of the drive assembly and the closure member may be used in the derivation of the force. Such methods are well known in the art and are not further elucidated herein.

In an embodiment of the open-roof assembly, the pinch detection unit comprises a third pinch detection system, the third pinch detection system being operatively coupled to the second pinch detection system. Upon a pinch detection by the third pinch detection system, the second threshold is lowered such that the second pinch detection system may detect a pinch with a hard object even faster and more reliably.

In an aspect, a method of detecting a pinch of a moveably arranged closure member of an open-roof assembly is provided. The method comprises the steps of comparing a movement of the closure member and a reference, while allowing a first tolerance between the movement and the reference; determining a first deviation in movement by the closure member, if the first tolerance is exceeded in the step of comparing a movement of the closure member and a reference; determining that a pinch occurs, if the first deviation in movement exceeds a first threshold in the step of determining a first deviation in movement by the closure member; comparing the movement of the closure member and the reference, while allowing a second tolerance between the movement and the reference, the second tolerance being larger than the first tolerance; determining a second deviation in movement by the closure member, if the second tolerance is exceeded in the step of comparing the movement of the closure member and the reference, while allowing a second tolerance; and determining that a pinch occurs, if the second deviation in movement exceeds a second threshold in the step of determining a second deviation in movement by the closure member, the second threshold being smaller than the first threshold.

In an embodiment of the method, the second tolerance has been selected so high that pinch of the closure member with a soft object having a stiffness smaller than a predetermined stiffness is not detected by the second pinch detection system. For example, the predetermined stiffness may be equal to or larger than 10 N/mm and in particular is equal to or larger than 15 N/mm.

In an embodiment, the reference represents a force exerted by the closure member as a function of a position of the closure member during undisturbed movement and the movement of the closure member corresponds to an actual force at an actual position of the closure member. For example, the actual force is determined based on one or more properties and parameters of the drive assembly.

In an embodiment of the method, further comprises the steps of determining a pinch using a third pinch detection system; and lowering the second threshold if a pinch is determined by the third pinch detection system in the step of determining a pinch using a third pinch detection system.

In a further aspect, a computer-readable storage medium storing computer executable instructions for instructing a control unit of an open-roof assembly to perform the method is provided. It is noted that the pinch detection unit as above described may be embodied in hardware or in software. In particular, as apparent to those skilled in the art, many processing means like a microcontroller, a microprocessor, ASIC, FPGA and the like means, may be suitably used. Further, a control unit, comprising the pinch detection unit, may be embodied with a single processing unit or with multiple processing units.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description with reference to the appended schematical drawings.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENT

Figure 1A:
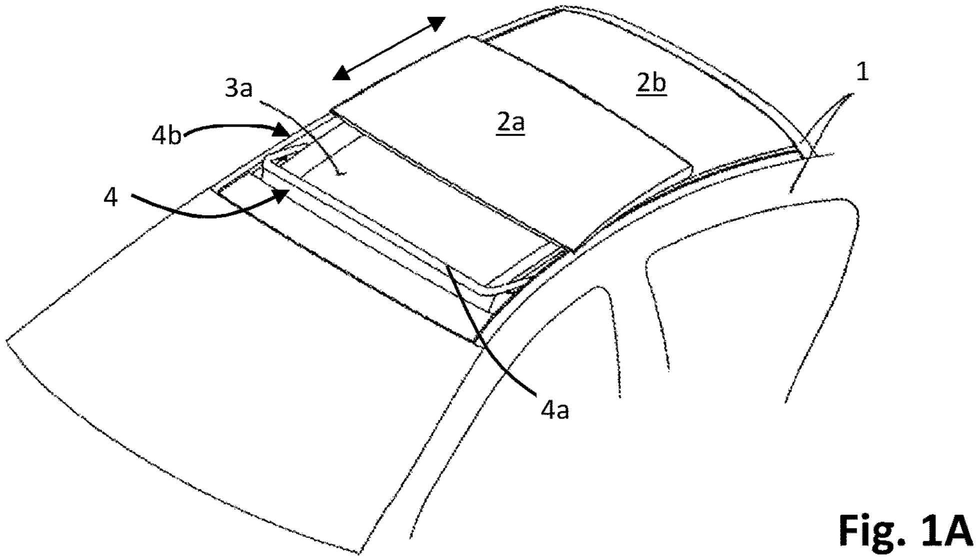
FIG. 1A shows a perspective view of a vehicle roof with an open roof assembly.

Aspects of the present invention will now be described with reference to the accompanying drawings, wherein the same reference numerals have been used to identify the same or similar elements throughout the several views.

FIG. 1A illustrates a vehicle roof 1 having an open roof assembly arranged therein. The open roof assembly comprises a moveable panel 2*a* and a fixed panel 2*b*. The moveable panel 2*a* is also referred to as a closure member, since the moveable panel 2*a* is moveable over a first roof opening 3*a* such to enable to open and to close the first roof opening 3*a*. A wind deflector 4 is arranged at a front side of the first roof opening 3*a*.

In the illustrated embodiment, the moveable panel 2*a* may be in a closed position, which is a position wherein the moveable panel 2*a* is arranged over and closes the first roof opening 3*a* and thus usually is arranged in a plane of the vehicle roof 1. Further, the moveable panel 2*a* may be in a tilted position, which is a position wherein a rear end RE of the moveable panel 2*a* is raised as compared to the closed position, while a front end FE of the moveable panel 2*a* is still in the closed position. Further, the moveable panel 2*a* may be in an open position, which is a position wherein the moveable panel 2*a* is slid open and the first roof opening 3*a* is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
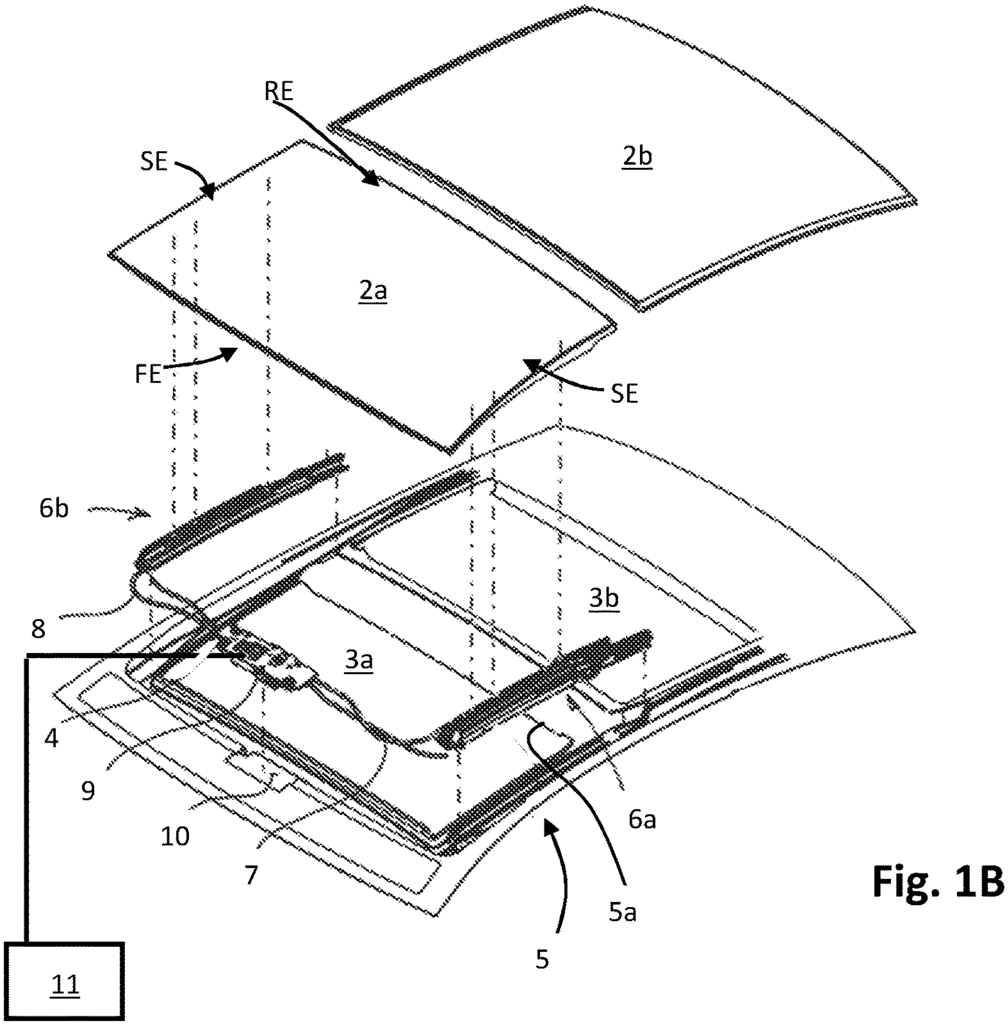
FIG. 1B shows an exploded view of the open roof assembly of FIG. 1A.

FIG. 1B illustrates the same vehicle roof as shown in FIG. 1A having panels 2*a* and 2*b*. In particular, while FIG. 1A shows the open roof assembly in the open position, FIG. 1B is an exploded view of the open roof assembly in a closed position. Further, in this exploded view of FIG. 1B, it is shown that there is a second roof opening 3*b*. The first and second roof openings 3*a*, 3*b* are provided in a frame 5 of the open roof assembly. An edge 5*a* of the frame 5 defines the first roof opening 3*a*.

The second roof opening 3*b* is arranged under the fixed panel 2*b* such that light may enter a vehicle interior passenger compartment through the fixed panel 2*b*, presuming that the fixed panel 2*b* is a glass panel or a similarly transparent panel, for example made of a plastic material or any other suitable material. The second roof opening 3*b* with a transparent or translucent fixed panel 2*b* is optional and may be omitted in another embodiment of the open roof assembly.

The wind deflector 4 is commonly a flexible material, e.g. a woven or non-woven cloth having through holes arranged therein or a web or net. The flexible material is supported by a support structure 4*a*, e.g. a bar-like or tube-like structure, which structure is hingedly coupled, directly or indirectly, to the frame 5 at a hinge 4*b*.

The wind deflector 4 is arranged in front of the first roof opening 3*a* and adapts air flow when the moveable panel 2*a* is in the open position. In its raised position, the wind deflector 4 reduces inconvenient noise due to air flow during driving. When the moveable panel 2*a* is in the closed position or in the tilted position, the wind deflector 4 is held down below the front end FE of the moveable panel 2*a*.

Usually, the wind deflector 4 is raised by a spring force when the moveable panel 2*a* slides to an open position and the wind deflector 4 is pushed down by the moveable panel 2*a* when the moveable panel 2*a* slides back into its closed position. In FIG. 1A, the moveable panel 2*a* is shown in an open position and the wind deflector 4 is shown in a raised position. In FIG. 1B, the moveable panel 2*a* is shown in a closed position and the wind deflector 4 is correspondingly shown in a position in which it is held down.

FIG. 1B further illustrates a drive assembly having a first guide assembly 6*a*, a second guide assembly 6*b*, a first drive cable 7 and a second drive cable 8. The first and second guide assemblies 6*a*, 6*b* are arranged on respective side ends SE of the moveable panel 2*a* and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6*a*, 6*b* and a electric motor 9.

The drive cables 7, 8 couple the electric motor 9 to the mechanisms of the respective guide assemblies 6*a*, 6*b* such that upon operating the electric motor 9, the mechanisms start to move. In particular, a core of the drive cable 7, 8 is moved by the electric motor 9 such to push or pull on the mechanisms of the respective guides 6*a*, 6*b*. Such a drive assembly is well known in the art and is therefore not further elucidated herein. Still, any other suitable drive assembly may be employed as well without departing from the scope of the present invention. Moreover, in a particular embodiment, an electric motor may be operatively arranged between the respective guides and the respective mechanisms of the guide assemblies 6*a*, 6*b* and, in such embodiment, a drive assembly may be omitted completely.

In the illustrated embodiment, the guide assemblies 6*a*, 6*b* may start movement with raising the rear end RE of the moveable panel 2*a*, thereby bringing the moveable panel 2*a* in the tilted position. Then, from the tilted position, the guide assemblies 6*a*, 6*b* may start to slide to bring the moveable panel 2*a* in the open position. The present invention is however not limited to such embodiment. For example, in another embodiment, the moveable panel 2*a* may be moveable to a tilted position by raising the rear end RE, while an open position is reached by first lowering the rear end RE and then sliding the moveable panel 2*a* under the fixed panel 2*b* or any other structure or element provided behind the rear end RE of the moveable panel 2*a*. In further exemplary embodiments, the moveable panel 2*a* may be merely moveable between a closed position and a tilted position or between a closed position and an open position.

In the illustrated embodiment, the electric motor 9 is mounted near or below the front end FE of the moveable panel 2_a_ at a recess 10. In another embodiment, the electric motor 9 may be positioned at any other suitable position or location. For example, the electric motor 9 may be arranged near or below the rear end RE of the moveable panel 2_a_ or below the fixed panel 2_b_.

A control module 11 is schematically illustrated and is operatively coupled to the electric motor 9. The control module 11 may be any kind of processing module, either a software controlled processing module or a dedicated processing module, like an ASIC, which are both well known to those skilled in the art. The control module 11 may be a stand-alone control module or it may be operatively connected to another control module, like a multipurpose, generic vehicle control module. In yet another embodiment, the control module 11 may be embedded in or be part of such a generic vehicle control module. Essentially, the control module 11 may be embodied by any control module suitable for, capable of and configured for performing operation of the electric motor 9 and thus the moveable roof assembly.

Figure 2A:
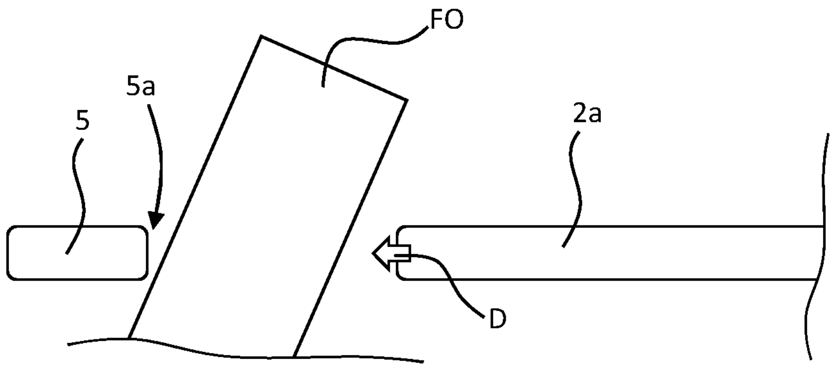
FIGS. 2A and 2B show a foreign object being pinched and trapped between a closure member and a frame of the open roof assembly of FIGS. 1A and 1B.

FIG. 2A shows a cross-section of the frame 5 and the moveable closure member 2_a_. A foreign object FO is arranged between the moveable closure member 2_a_ and the edge 5_a_ of the frame 5. The moveable closure member 2_a_ moves in a closing direction D towards the edge 5_a_.

Figure 2B:
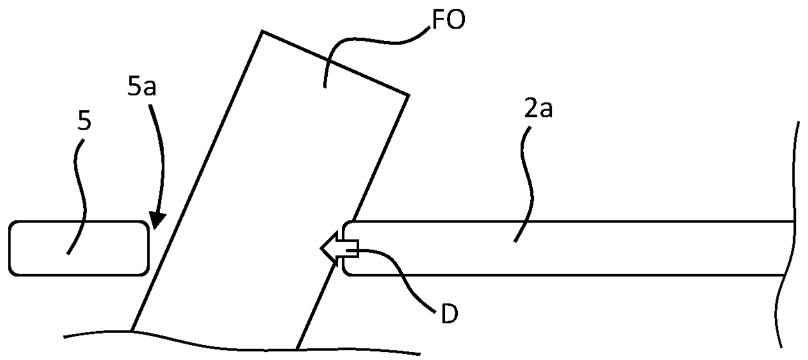

FIG. 2B shows the closure member 2_a_, the foreign object FO and the frame 5 of FIG. 2A, wherein the closure member 2_a_ has advanced in the closing direction D. A front edge of the closure member 2_a_ touches the foreign object FO. With further advancement of the closure member 2_a_, the foreign object FO becomes trapped between the edge 5_a_ and the closure member 2_a_. Due to this entrapment, the closure member 2_a_ can only move further in the closing direction D by compressing the foreign object FO. A stiffness of the foreign object FO determines the amount of movement possible and any force needed therefor. If the foreign object FO is soft and thus has a relatively low stiffness, e.g. expressed as a low spring rate of less than 10 N/mm or less than 15 N/mm, for example, the closure member 2_a_ may be advanced with a slowly increasing force. If the foreign object FO is hard and thus has a relatively high stiffness, e.g. expressed as a high spring rate of higher than 50 N/mm or higher than 60 N/mm or even higher than 65 N/mm, for example, the closure member 2_a_ can only be advanced with a rapidly increasing force.

Figure 2C:
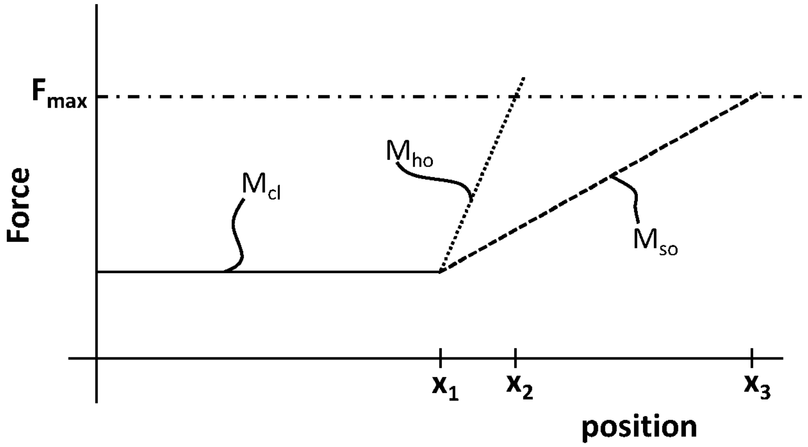
FIG. 2C illustrates a force exerted by a closure member on a trapped foreign object.

FIG. 2C illustrates a relation between position and needed force. In particular, on the horizontal axis, position is represented and the vertical axis represents an exerted force. $F_{max}$ represents a maximum force to be exerted on a foreign object before a movement of the closure member is interrupted and preferably reversed.

In FIG. 2C, the solid line shows a force exerted by or on the closure member during an undisturbed closing movement $M_{cl}$. At position $x_1$, a foreign object is pinched. If the foreign object is hard and thus has a high stiffness, an exerted force increases rapidly during a hard-object disturbed closing movement $M_{ho}$ (dotted line) and reaches the maximum force at position $x_2$. If the foreign object is soft and has a low stiffness, the exerted force increases slowly during a soft-object disturbed closing movement $M_{so}$ (dashed line) and reaches the maximum force at position $x_3$. As apparent from FIG. 2C, if a soft object is pinched, a significantly longer displacement length is available for pinch detection and interruption/reversal of the closing movement compared to a pinch with a hard object.

It is noted that upon detection of a pinch, the control unit and the drive assembly (inertia and play in the drive assembly) require some time and thus displacement of the closure member before the closure member is actually stopped or reversed. Therefore and in view of the rapid force increase in case of a pinch with a hard object, a pinch with a hard object needs to be detected at a smaller force to be in time for preventing exceeding the maximum force $F_{max}$, which makes such a detection inevitably more sensitive to incorrect pinch detection.

In order to detect both hard and soft foreign objects timely and reliably without an excessive number of incorrect detections, many different pinch detection systems have been described in prior art. For detecting any kind of foreign objects having different stiffnesses, combinations of two or even more pinch detection systems have been proposed. However, for reliably detecting a hard foreign object, it has remained challenging to prevent an excessive number of incorrect detections, which could lead to an excessive number of unnecessary reversals and potentially could prevent closing of the open roof assembly when driving on e.g. a rocky or bumpy road.

Figure 3A:
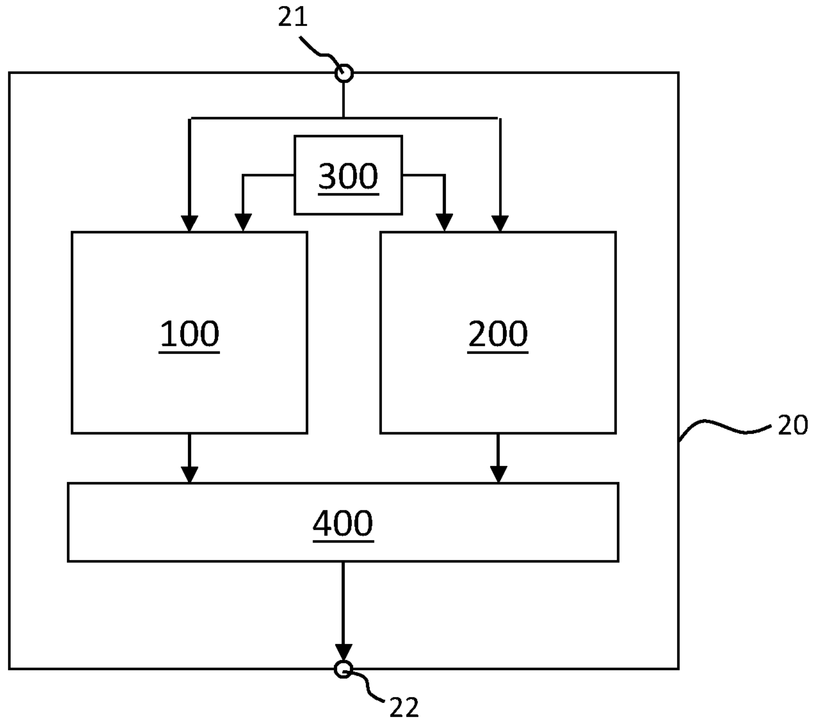
FIG. 3A shows a diagram of a first embodiment of a pinch detection unit.

FIG. 3A shows an embodiment of a pinch detection unit 20 for use in, or in combination with, a control unit of an open roof assembly, for example in the control unit 11 of FIG. 1B. The pinch detection unit 20 comprises an input terminal 21 and an output terminal 22. The input terminal 21 may be configured to receive an input signal from the control unit, wherein the input signal comprises one or more data signals representing one or more physical properties sensed, measured or generated by the control unit, which physical properties relate to the movement of the closure member, as known in the art. For example, the physical properties may include a voltage and a current supplied to an electric motor, a rotational speed of such electric motor, a position of the closure member, a speed of the closure member, a temperature, and any other property relevant to the movement of the closure member. The data signals are fed to a first pinch detection system 100 and a second pinch detection system 200. All data signals may be fed to each pinch detection system 100, 200 or specific ones of the data signals may be fed to a specific one of the pinch detection systems 100, 200, e.g. dependent on which such data signals are needed by such pinch detection system 100, 200.

An output signal at the output terminal 22 is configured to indicate a detection of a pinch such that the control unit may stop or reverse the movement of the closure member in response to such an output signal.

The first pinch detection system 100 is configured to detect a pinch with a soft object, although that does not excludes that the first pinch detection system 100 might detect a pinch with a hard object as well.

A known and common pinch detection system may be employed as the first pinch detection system. Such first pinch detection system compares a force exerted by the drive assembly driving the moveable closure member with a predetermined reference 300. For increased accuracy, such reference 300 may be dependent on the position of the closure member. Such position dependent reference 300 may be predetermined and stored during manufacturing of the open roof assembly or the reference 300 may be determined or updated during a preceding closing movement that is executed without disturbance.

In practice, alternatively or additionally, any other property relating to the force may be employed. For example, the current supplied to the electric motor of the drive assembly, a voltage supplied to the electric motor of the drive assembly, a rotational motor speed, a travel speed of the closure member, and the like, may be suitable for detecting an abnormal closing operation due to a pinch.

A configuration setting of such a first pinch detection system 100 may be a threshold for a deviation of the actual property value from the reference 300. When the deviation exceeds the threshold, a pinch may be determined to have occurred. With a soft object, a relatively high threshold may be selected as sufficient time may remain to reverse the movement before the maximum force is reached. With a hard object, detection needs to be quicker and thus needs a lower threshold, which results in less reliability as it may be accidentally exceeded, e.g. due to rocky or bumpy road conditions, for example.

The second pinch detection system 200 is configured to detect a pinch with a hard object. The second pinch detection system 200 may be suitable to detect only hard objects or may be configurable to detect a pinch with either soft or hard objects or may be suited to detect a pinch with any kind of object.

Suitable pinch detection systems for quickly detecting a pinch with a hard object are known. For example, mathematical models of the mechanical system, comprising the drive assembly and the closure member, may be used to quickly detect an abnormal movement or behaviour of the mechanical system. Such a mathematical model may be used in combination with a disturbance observer and a state space representation, as known in the art. Still, in the embodiment of FIG. 3A, the second pinch detection system 200 employs a comparison with the reference 300 as well. While the pinch detection method is essentially the same as the first pinch detection system, certain settings and parameters of the second pinch detection system 200 are different from the first pinch detection system 100 such that the second pinch detection system 200 is more sensitive to a pinch with a hard object without reducing reliability of the detection. These settings and parameters are elucidated hereinbelow in relation to FIG. 3B.

An output module 400 is operatively coupled to both the first pinch detection system 100 and the second pinch detection system 200. When either one of the first pinch detection system 100 and the second pinch detection system 200 determines that a pinch occurs, the output module 400 receives a signal indicating such occurrence. Then, the output module 400 provides a corresponding signal on the output terminal 22 of the pinch detection unit 20.

Figure 3B:
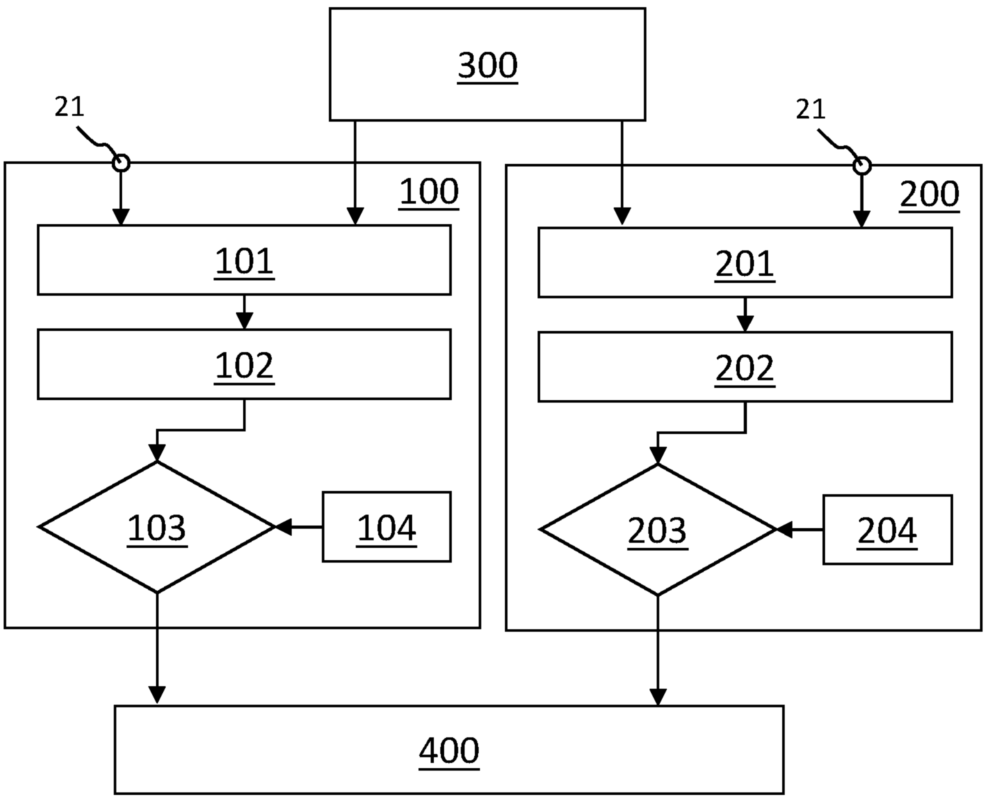
FIG. 3B shows a detailed diagram of the first embodiment of the pinch detection unit of FIG. 3A.

FIG. 3B illustrates the first pinch detection system 100 and the second pinch detection system 200 in more detail. It is noted that the second pinch detection system 200 is similar to the first pinch detection system 100, comprising the same modules and components, but having different settings and parameters as described below.

From input terminal 21, a data signal representing an actual movement of the closure member is provided to a first tracker module 101 and a second tracker module 201. Each tracker module compares the actual movement of the closure member with the reference 300, taking into account a predetermined tolerance. The tolerance may be a simple tolerance margin around the reference 300. However, in an embodiment, the tolerance takes into account more aspects and properties to determine whether a difference between the actual movement and the reference 300 is a significant deviation or merely a minor difference. For example, a previous difference between the actual movement and the reference 300 may be taken into account. Thus, a minor, but increasing difference between the actual movement and the reference 300 may thus be accepted by a tracker module.

In the first pinch detection system 100, a first tolerance is used by the first tracker module 101. The first tolerance is relatively small compared to a second tolerance used by the second tracker module 201 of the second pinch detection system 200. As a result, in particular with a pinch with a soft object, an increasing difference between the actual movement and the reference 300 will relatively quickly exceed the first tolerance, while the second tolerance may be exceeded later or may not be exceeded at all, depending on the selected tolerance and the stiffness of the pinched object. On the other hand, with a pinch of a hard object, the first tolerance will be exceeded quickly and the second tolerance will be exceeded quickly as well.

An output of the first tracker module 101 is supplied to a first deviation module 102 and an output of the second tracker module 201 is supplied to a second deviation module 202. In particular, if one or both of the tracker modules 101, 201 has determined that the actual movement exceeds the reference 300 including the corresponding tolerance, the corresponding deviation module 102, 202 determines the actual deviation. In particular, the first deviation module 102 determines a first deviation and the second deviation module 202 determines a second deviation. In an embodiment, such deviation may be determined as the difference between the actual movement and the reference 300 including the corresponding tolerance, while in another embodiment, the deviation may be determined as the difference between the actual movement and the reference 300 without taking into account the corresponding tolerance.

Any deviation as determined by either the first deviation module 102 or the second deviation module 202 is supplied to a first pinch determination module 103 or a second pinch detection module 203, respectively. The first pinch determination module 103 compares the first deviation with a first threshold 104, while the second pinch determination module 203 compares the second deviation with a second threshold 204. If either deviation exceeds the respective threshold 104, 204, the corresponding pinch determination module 103, 203 outputs a pinch detection signal to the output module 400.

In order to timely detect a pinch with a hard object, the second threshold 204 is selected to be lower than the first threshold 104. So, while the relatively large tolerance of the second tracker module 201 prevents early detection of a second deviation, the second threshold 204 ensures that as soon as a second deviation is indeed determined, it will relatively quickly result in a detection of a pinch, in particular with a hard object. On the other hand, while the relatively small tolerance of the first tracker module 101 provides early detection of a first deviation, the first threshold 104 ensures that the first deviation may increase over a certain amount of time, while still ensuring that such pinch with a soft object will be determined in time and preventing an accidental incorrect determination of a pinch with a soft object.

Figure 4A:
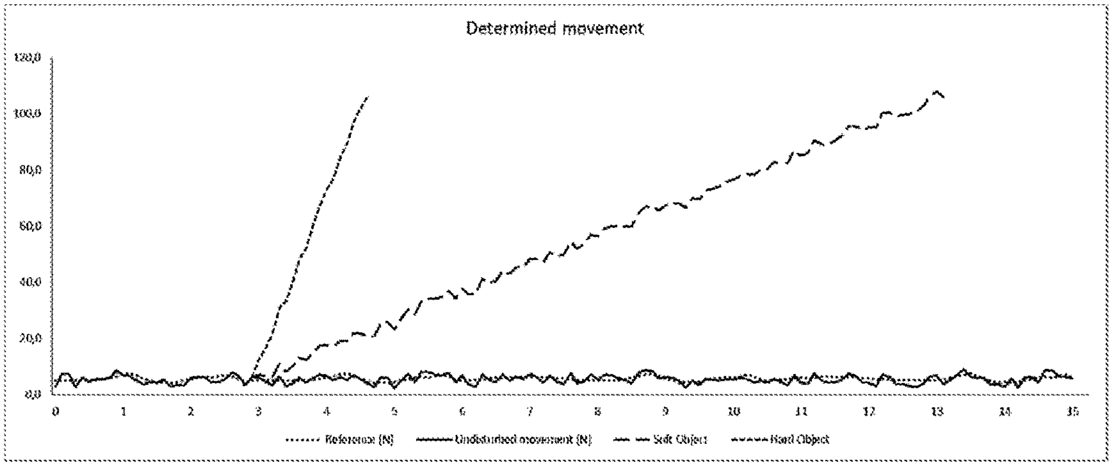
FIG. 4A shows a graph of a reference of an undisturbed movement of a closure member and a graph of a simulation of a movement of a closure member in an undisturbed movement, in a movement pinching a soft object and in a movement pinching a hard object.
Figure 4B:
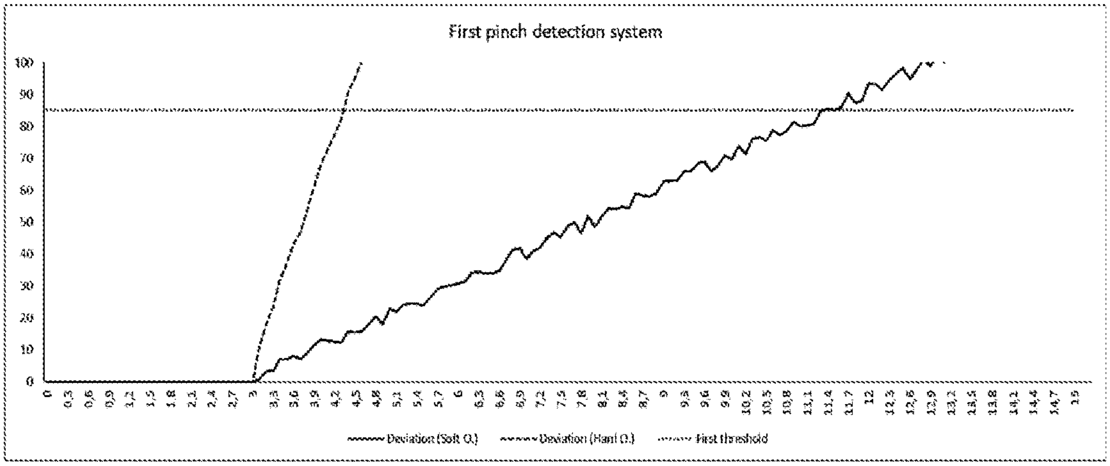
FIG. 4B shows a graph of a deviation of the pinching movements of FIG. 4A as determined by a first pinch detection system.
Figure 4C:
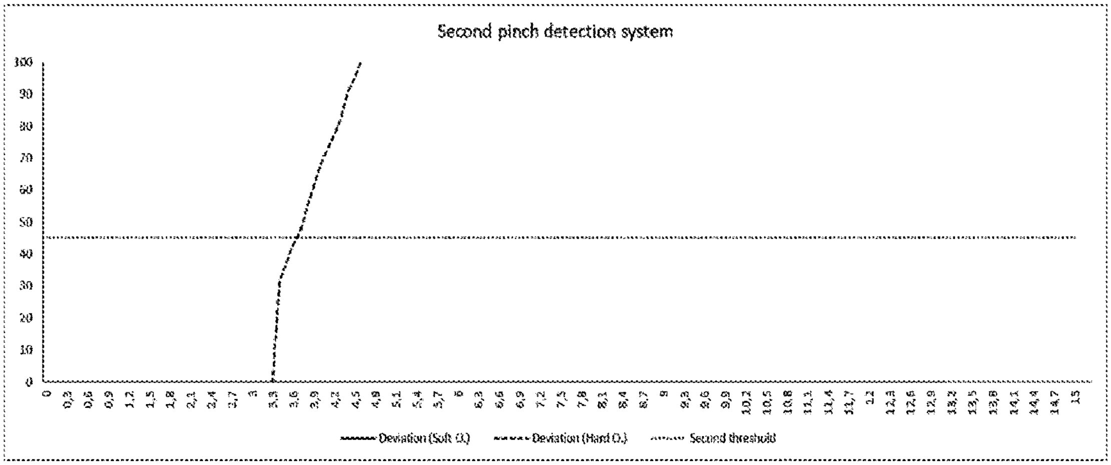
FIG. 4C shows a graph of a deviation of the pinching movements of FIG. 4A as determined by a second pinch detection system.

FIGS. 4A-4C illustrate the above-described method as implemented in the embodiment of FIGS. 3A and 3B. The graphs and underlying data are theoretical data merely for explanatory purposes.

FIG. 4A shows a graph of a force generated in the drive assembly and exerted on the closure member for movement. Upon a pinch, the force is transferred through the closure member on the pinched object. The horizontal axis represents a displacement of the closure member in millimetres.

As indicated in FIG. 4A, the solid line shows the generated force during an undisturbed movement and the dotted line represents the reference. As apparent, the solid line and the dotted line are comparable. Still, at multiple points in time, there is a minor difference between the undisturbed movement and the reference. The tracker module as above described, employing the first or second tolerance, ignores such differences and no deviation is determined.

In FIG. 4A, the long-dashed graph corresponds to a movement of the closure member, wherein the closure member pinches a soft object having a stiffness of about 10 N/mm after about 3 millimetre. Due to the pinch, the force increases with the displacement of the closure member. Without intervention, the generated force would increase to about 100 N after a displacement of about 12.5 mm.

The short-dashed graph corresponds to a pinch with a hard object having a stiffness of about 60 N/mm after about 3 millimetre. In this case, after a displacement of about 4.5 mm the generated force will already be about 100 N.

FIG. 4B illustrates the response of the first pinch detection system of the above-described first embodiment of the pinch detection unit. In particular, FIG. 4B shows a graph representing the first deviation as determined by the first deviation determination module. The solid line corresponds to the displacement of the closure member with a pinch with a soft object, corresponding to the long-dashed graphs of FIG. 4A. The short-dashed line relates to the displacement with a pinch with a hard object, corresponding to the short-dashed graph of FIG. 4A. The dotted graph shows the first threshold, which in this exemplary embodiment is selected to be 85 N. In practice, another value may be selected as apparent to those skilled in the art.

It is noted that in the present exemplary embodiment, the deviation is selected to amount to the difference between the actual movement and the reference, when the tracker module has determined that the respective tolerance has been exceeded. As above mentioned, in another embodiment, the deviation may be determined as the difference between the actual movement and the reference, including the tolerance. In such embodiment, the deviation shown in FIGS. 4B and 4C will be smaller.

Referring to FIG. 4B, during the first 3 millimetres, there is an undisturbed movement of the closure member. The first tracker module and the first deviation determination module determine that there is indeed no deviation. Due to the relatively small first tolerance, from 3 millimetres, the first deviation starts to increase. At a displacement of about 11.5 mm, the first deviation exceeds the first threshold and the pinch with the soft object is detected by the first pinch detection system. At a displacement of about 4.4 mm, the first deviation exceeds the first threshold and the pinch with the hard object is detected by the first pinch detection system.

FIG. 4C illustrates the response of the second pinch detection system of the above-described first embodiment of the pinch detection unit. In particular, FIG. 4C shows a graph representing the second deviation as determined by the second deviation determination module. The solid line corresponds to the displacement of the closure member with a pinch with a soft object, corresponding to the long-dashed graphs of FIG. 4A. The short-dashed line relates to the displacement with a pinch with a hard object, corresponding to the short-dashed graph of FIG. 4A. The dotted graph shows the second threshold, which in this exemplary embodiment is selected to be 85 N. In practice, another value may be selected as apparent to those skilled in the art.

During the first 3 millimetres, there is an undisturbed movement of the closure member. The second tracker module and the second deviation determination module determine that there is indeed no deviation. Due to the relatively large second tolerance, from 3 millimetres, the second deviation starts to increase only for the pinch with the hard object. The pinch with the soft object results in such a slow increase of the generated force that it remains within the second tolerance of the second tracker module. On the other hand, the pinch with the hard object results in a detection of the deviation from about 3.4 mm (deviation jumps from 0 N to about 30 N due to the selected method of determining the deviation as above described) and at a displacement of about 3.6 mm, the second deviation exceeds the second threshold. The pinch with the hard object is thus detected by the second pinch detection system sooner than by the first pinch detection system, leaving more time to stop or reverse the closure member.

Figure 5:
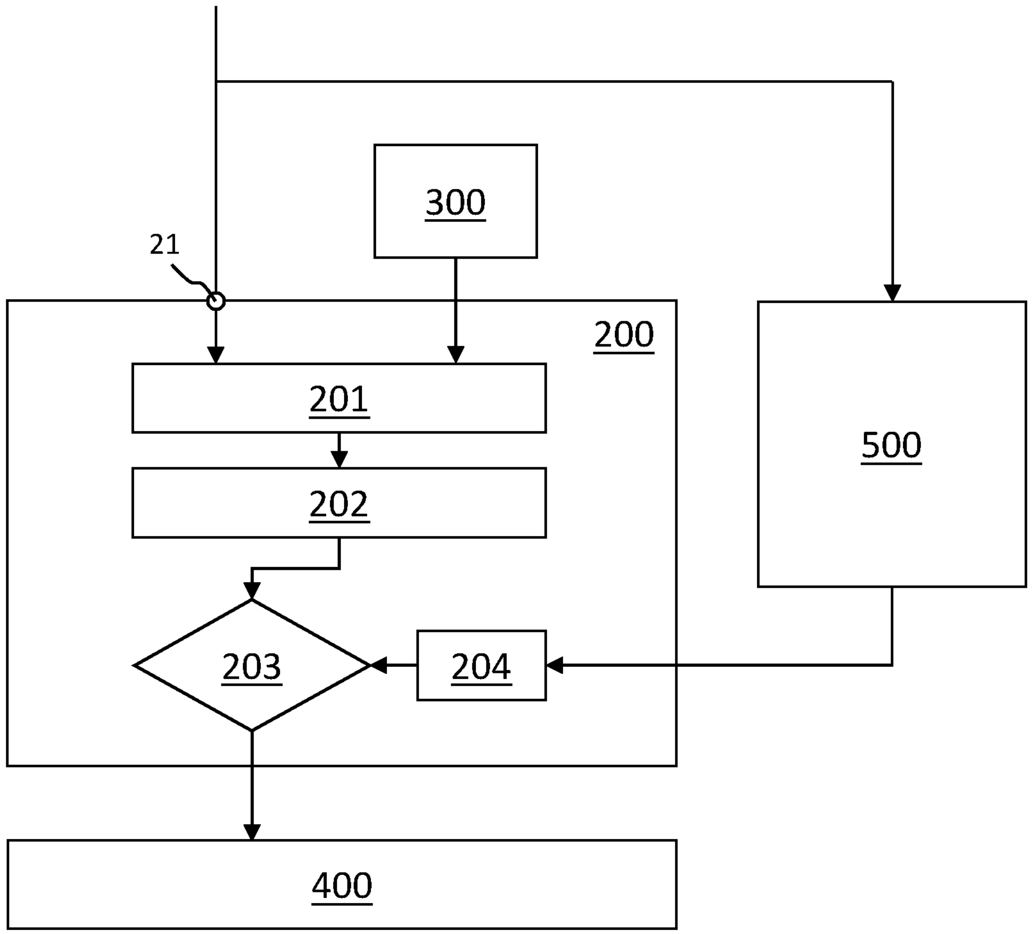
FIG. 5 shows a diagram of a second embodiment of a pinch detection unit.

FIG. 5 illustrates a second embodiment of the pinch detection unit. In particular, the second pinch detection system 200 is shown, which corresponds to the second pinch detection system 200 of the first embodiment. The first pinch detection system of the second embodiment is not shown in FIG. 5, but, in practice, the first pinch detection system is present as well. In comparison to the first embodiment of FIGS. 3A and 3B, a third pinch detection system 500 is introduced. The third pinch detection system 500 may be any suitable pinch detection system, e.g. for detecting a pinch with a hard object even sooner than the second pinch detection system 200. The third pinch detection system 500 is then operatively coupled to the second threshold 204. If the third pinch detection system 500 detects a pinch, the second threshold 204 may be decreased, such that the second pinch detection system 200 may detect the pinch even sooner. In a particular embodiment, the second pinch detection system 200 may be configured to reliably detect a pinch with a medium hard object, while the third pinch detection system 500 may ensure that a pinch with a hard object is detected timely and reliably as well. This method corresponds to the method as described in EP4043681.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. An open-roof assembly for covering or at least partly uncovering an opening in a vehicle roof, the open-roof assembly comprising a moveably arranged closure member, a drive assembly configured to move the closure member and a control unit operatively coupled to the drive assembly and configured to control a movement of the closure member, wherein the control unit comprises a pinch detection unit configured to detect a pinch of the closure member with an object, the pinch detection unit comprising a first pinch detection system, a second pinch detection system and a predetermined reference, the predetermined reference representing an undisturbed movement of the closure member, wherein the first pinch detection system comprises:

- a first tracker module configured to compare the movement of the closure member and the reference, the first tracker module allowing a first tolerance between movement and the reference;
- a first deviation module configured to determine a first deviation in movement by the closure member, if the first tolerance is exceeded; and
- a first pinch determination module configured to determine that a pinch occurs, if the first deviation in movement exceeds a first threshold; and wherein the second pinch detection system comprises:

- a second tracker module configured to compare the movement of the closure member and the reference, the second tracker module allowing a second tolerance between movement and the reference, the second tolerance being larger than the first tolerance;
- a second deviation module configured to determine a second deviation in movement by the closure member, if the second tolerance is exceeded; and
- a second pinch determination module configured to determine that a pinch occurs, if the second deviation in movement exceeds a second threshold, the second threshold being smaller than the first threshold; and wherein the pinch detection unit is configured to determine that a pinch occurs if at least one of the first and the second pinch detection systems determines that a pinch occurs.

2. The open-roof assembly according to claim 1, wherein the second tolerance has been selected so high that pinch of the closure member with a soft object having a stiffness smaller than a predetermined stiffness is not detected by the second pinch detection system.

3. The open-roof assembly according to claim 2, wherein the predetermined stiffness is equal to or larger than 10 N/mm.

4. The open-roof assembly according to claim 3, wherein the predetermined stiffness is equal to or larger than 15 N/mm.

5. The open-roof assembly according to claim 1, wherein the reference represents a force exerted by the closure member as a function of a position of the closure member during undisturbed movement and wherein the movement of the closure member corresponds to an actual force at an actual position of the closure member.

6. The open-roof assembly according to claim 5, wherein the actual force is determined based on one or more properties and parameters of the drive assembly.

7. The open-roof assembly according to claim 1, wherein the pinch detection unit comprises a third pinch detection system, the third pinch detection system being operatively coupled to the second pinch detection system, wherein upon a pinch detection by the third pinch detection system the second threshold is lowered.

8. A method of detecting a pinch of a moveably arranged closure member of an open-roof assembly, the method comprising:

a) comparing a movement of the closure member and a reference, while allowing a first tolerance between the movement and the reference; and b) determining a first deviation in movement by the closure member, if the first tolerance is exceeded in step a);

c) determining that a pinch occurs, if the first deviation in movement exceeds a first threshold in step b); and d) comparing the movement of the closure member and the reference, while allowing a second tolerance between the movement and the reference, the second tolerance being larger than the first tolerance;

e) determining a second deviation in movement by the closure member, if the second tolerance is exceeded in step d); and f) determining that a pinch occurs, if the second deviation in movement exceeds a second threshold in step e), the second threshold being smaller than the first threshold.

9. The method according to claim 8, wherein the second tolerance has been selected so high that pinch of the closure member with a soft object having a stiffness smaller than a predetermined stiffness is not detected.

10. The method according to claim 9, wherein the predetermined stiffness is equal to or larger than 10 N/mm.

11. The method according to claim 10, wherein the predetermined stiffness is equal to or larger than 15 N/mm.

12. The method according to claim 8, wherein the reference represents a force exerted by the closure member as a function of a position of the closure member during undisturbed movement and wherein the movement of the closure member corresponds to an actual force at an actual position of the closure member.

13. The method according to claim 12, wherein the actual force is determined based on one or more parameters of a drive assembly configured to move the closure member.

14. The method according to claim 8 further comprising:

g) determining a pinch using a third pinch detection system, and h) lowering the second threshold if a pinch is determined by the third pinch detection system in step g).

15. A computer-readable storage medium storing computer executable instructions for instructing a control unit of an open-roof assembly to perform a method of detecting a pinch of a moveably arranged closure member of an open-roof assembly, the method comprising:

a) comparing a movement of the closure member and a reference, while allowing a first tolerance between the movement and the reference; and b) determining a first deviation in movement by the closure member, if the first tolerance is exceeded in step a);

c) determining that a pinch occurs, if the first deviation in movement exceeds a first threshold in step b); and d) comparing the movement of the closure member and the reference, while allowing a second tolerance between the movement and the reference, the second tolerance being larger than the first tolerance;

e) determining a second deviation in movement by the closure member, if the second tolerance is exceeded in step d); and f) determining that a pinch occurs, if the second deviation in movement exceeds a second threshold in step e), the second threshold being smaller than the first threshold.

16. The computer-readable storage medium of claim 15, wherein the second tolerance has been selected so high that pinch of the closure member with a soft object having a stiffness smaller than a predetermined stiffness is not detected.

17. The computer-readable storage medium of claim 16, wherein the predetermined stiffness is equal to or larger than 10 N/mm.

18. The computer-readable storage medium of claim 15, wherein the reference represents a force exerted by the closure member as a function of a position of the closure member during undisturbed movement and wherein the movement of the closure member corresponds to an actual force at an actual position of the closure member.

19. The computer-readable storage medium of claim 18, wherein the actual force is determined based on one or more parameters of a drive assembly configured to move the closure member.

20. The computer-readable storage medium of claim 15 further comprising:

g) determining a pinch using a third pinch detection system, and h) lowering the second threshold if a pinch is determined by the third pinch detection system in step g).

* * * * *